United States Patent

[11] 3,563,212

[72] Inventor Lawrence C. Hoagland
 Concord, Mass.
[21] Appl. No. 853,264
[22] Filed Aug. 27, 1969
[45] Patented Feb. 16, 1971
[73] Assignee Steam Engine Systems Corporation
 Newton, Mass.

[54] VAPOR GENERATOR
 13 Claims, 5 Drawing Figs.
[52] U.S. Cl. .................................................. 122/250,
 122/367
[51] Int. Cl. .............................................. F22b 27/08
[50] Field of Search ........................................ 122/33,
 249, 250, 367

[56] References Cited
 UNITED STATES PATENTS
| | | | |
|---|---|---|---|
| 1,074,110 | 9/1913 | Fyfe | 122/367X |
| 1,815,570 | 7/1931 | Jones | 122/367X |
| 1,842,701 | 1/1932 | Vedrinsky | 122/250 |
| 1,903,807 | 4/1933 | Doble | 122/250 |
| 3,396,782 | 8/1968 | Valyi | 122/33 |

*Primary Examiner*—Kenneth W. Sprague
*Attorney*—Edgar H. Kent

ABSTRACT: A vapor generator utilizing heated gases to convert a feed liquid (e.g. water) to superheated vapor comprises at least two nested heat exchange members, each having a coiled tubular portion and a thermally conductive porous (e.g., brazed metal) matrix between adjacent windings of the tubing (or even surrounding the tubular portions entirely), these portions being located in series with respect to both heated gas and liquid flow in cross-counterflow arrangement, and connected in series to define a continuous tubular liquid to vapor passage and a thermal conduction barrier between the feed liquid heating zone and the vapor superheating zone of this passage, and between the matrices in the region of these zones.

Patented Feb. 16, 1971

VAPOR GENERATOR

This invention relates to vapor generators for converting liquid, usually water, into superheated vapor, usually steam, utilizing hot air or combustion products as a heat source.

The object of the invention is to provide such a generator which is more compact and efficient than generators heretofore available and which is suitable for a wide range of industrial applications, particularly for powering external combustion engines used in land, water or air conveyances and the like. Since the generator according to the invention is most usually a steam generator it will be described hereinafter as such, it being understood however that other liquids than water may be utilized therein to generate other superheated vapors than steam.

Conventional vapor generators typically utilize bare circular tubes with high-pressure water and steam flowing inside and the combustion gases flowing outside. In such a configuration, the heat transfer coefficients between the hot combustion gases and the tube wall are rather low compared with the much higher transfer coefficients obtained inside the tube between the water and the tube wall. As a result the overall transfer coefficient and hence the total tube surface and exchanger volume required are controlled by the heat transfer behavior on the combustion gas side.

Under these circumstances, it is desirable to utilize extended surface on the combustion gas side in order to reduce the heat exchanger weight and volume. The term "extended surface" refers to various techniques utilized to provide greater heat transfer surface area in contact with the hot combustion gases than that in contact with the water and steam. This is achieved conventionally by the use of fins on the outside of the tubes.

The present invention utilizes a more effective means for providing the extended surface which is to utilize a porous matrix of a material having relatively high thermal conductivity. The matrix is constructed so as to be in good thermal contact with the tubes, and the hot combustion gases flowing through the myriad pores in the matrix transfer their heat to the matrix surfaces which they contact and this heat is then conducted through the matrix to the surface of the tube and hence into the water.

In a preferred embodiment a high conductivity matrix is formed of a packed bed of metal particles such as metal shot (spheres) which surrounds the tubes preferably completely and is sintered or brazed, so that the particles of the bed are adhered to one another and the bed is adhered to the tubes by conductive metal bonds. This matrix has the advantages of being (1) relatively inexpensive, (2) capable of providing small hydraulic diameters easily (gives high surface to volume ratio) and (3) capable of achieving high thermal conductance throughout to help reduce hot spots and maintain low metal temperatures where hot combustion gases enter.

The use of an extended surface a matrix as described above provides a means of achieving compactness in the generator. In addition to compactness, high thermal efficiency in the generator, is desired; i.e. it is desired to extract as much heat as practically possible from the hot combustion gases before discharging them to the atmosphere. To achieve the high thermal efficiency the generator, according to the invention, utilizes cross-counterflow heat exchange between the combustion gases and the water. In a pure counterflow arrangement the combustion gases would enter where the superheated steam leaves and exit where the feed water enters.

However, the long gas flow path of the pure counterflow arrangement is not attractive for use with the porous matrix type of extended surface, due primarily to the high pressure drop characteristic of the porous matrix which requires that the gas flow length be kept relatively small in order that the hot gas may be provided at practicable low-pressure. The generator according to the invention utilizes a multipass cross-counterflow arrangement which approaches pure counterflow performance. In such arrangement, the water and steam tube is arranged in two or more concentric layers of helices with the matrix filling at least the region between adjacent windings, and the hot gases applied at the superheated steam side of the generator. The helices are connected to form a continuous tubular passage having, successively, a feed liquid heating zone, a boiling liquid zone, and a vapor superheating zone.

While porous metal matrices have the advantage of high thermal conductance, they also have the disadvantage that such conductance in the gas flow direction heats the gas exit side too high so that the gas exit temperature is substantially above the inlet water temperature and efficiency is impaired. A major feature of the present invention is that this difficulty is largely overcome by providing thermal conduction barriers, preferably airgaps, between the gas inlet and gas exit sides of the generator. In a preferred arrangement, these barriers thermally insulate the feedwater and superheating zones of the matrix from each other.

The invention will be further described in connection with the accompanying drawings illustrating preferred embodiments thereof, wherein.

Figure 1:
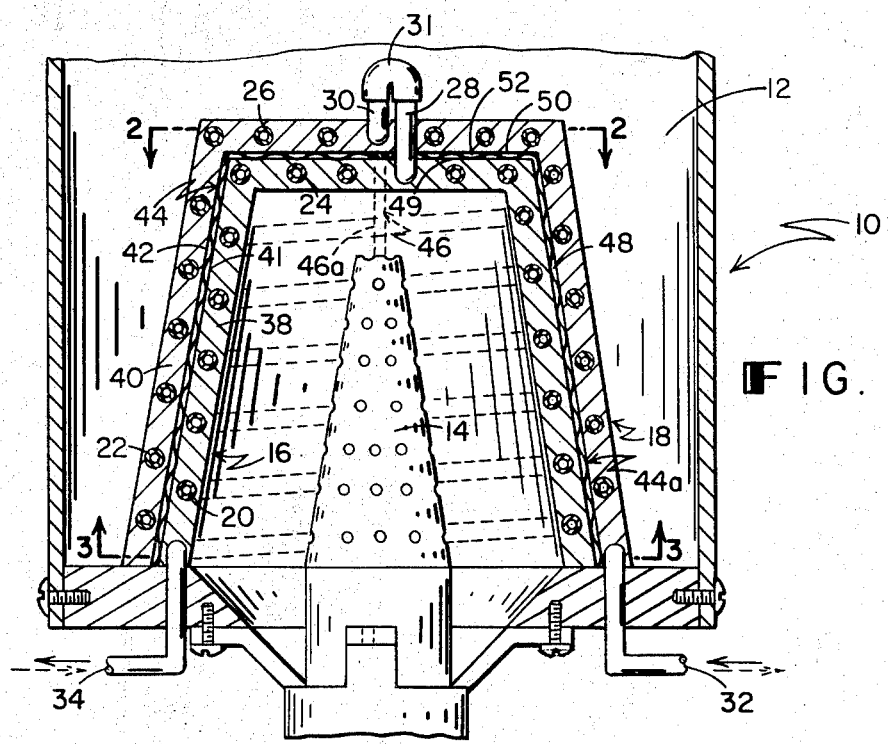
FIG. 1 is a somewhat schematic, sectional view of a first embodiment of the present invention.

In FIG. 1 there is shown a steam generator 10, including a manifold 12, a burner 14 (e.g., a gas burner), and concentric truncated conical heat exchange members 16, 18, having their sides formed of helically wound thermally conductive tubing 20, 22, and their apices formed of spirally wound thermally conductive tubing 24, 26. Tubing 24 and tubing 26 are connected across axial tubing portions 28, 30 by connecting tube 31 to form a continuous tubular passage having a feed liquid inlet 32 and a superheated vapor outlet 34. This tubing is enclosed in porous thermally conductive matrices 38, 40 of heat exchange members 16, 18, respectively.

As previously described, a preferred matrix is formed of metal shot, brazed together and to the outer wall of the tubing by a suitable thermally conductive brazing material. The outer peripheral surface 41 of matrix 38 and the inner peripheral surface 42 of matrix 40 are separated by thin U-shaped (e.g., corrugated stainless steel) spacer members 44, 46 having axially extending, 90° spaced portions 44a, 46a, which maintain the matrices a predetermined distance apart to form therebetween a circumferential gap 48 filled with heated or combustion gases and defining a thermal conduction barrier between the matrices. The crossbar portions 44b, 46b are provided to separate outer top surface 49 of matrix 38 from the inner top surface 50 of matrix 40 to form another radially extending gaseous gap 52, although, since the temperature differential between liquid and vapor in tubing 24 and 26 is not substantial, this gap is optional, it being possible to have surfaces 49 an 50 in thermal contact.

In operation, with burner 14 disposed interiorly of the heat exchange members, hot gases flow outwardly through the porous matrices 38, 40, with heat to the liquid-containing tubing being efficiently conducted through the thermally conductive shot and brazing material. Feed liquid enters at inlet 32 (solid arrows), traverses outer helical tubing 22 and spiral tubing 26, 24, being gradually heated to boiling therein, and reaches a superheated vapor temperature in inner helical tubing 20 prior to exit at superheated vapor outlet 34. The thermal conduction gas barriers between heat exchange members 16 and 18 insulate the feed liquid zone (lower portion of helical tubing 20), reducing heat transfer therebetween, so that gases exiting from matrix 40 toward the manifold will not be substantially hotter than the feed liquid temperature at the adjacent tubing. Of course, due to the thermal conductivity of the matrices, and the surrounding thermally conductive contact of each matrix with the tubing, heat may be conducted in all directions through the matrix to the tubing.

Where the burner is placed exteriorly of (e.g., surrounding) heat exchange member 18, liquid flow will be in the reverse direction (broken arrows), from feed liquid inlet 34 to superheated vapor outlet 32, the thermal conduction barriers now impeding inward heat conductance between heat exchange members 16, 18.

Figure 4:
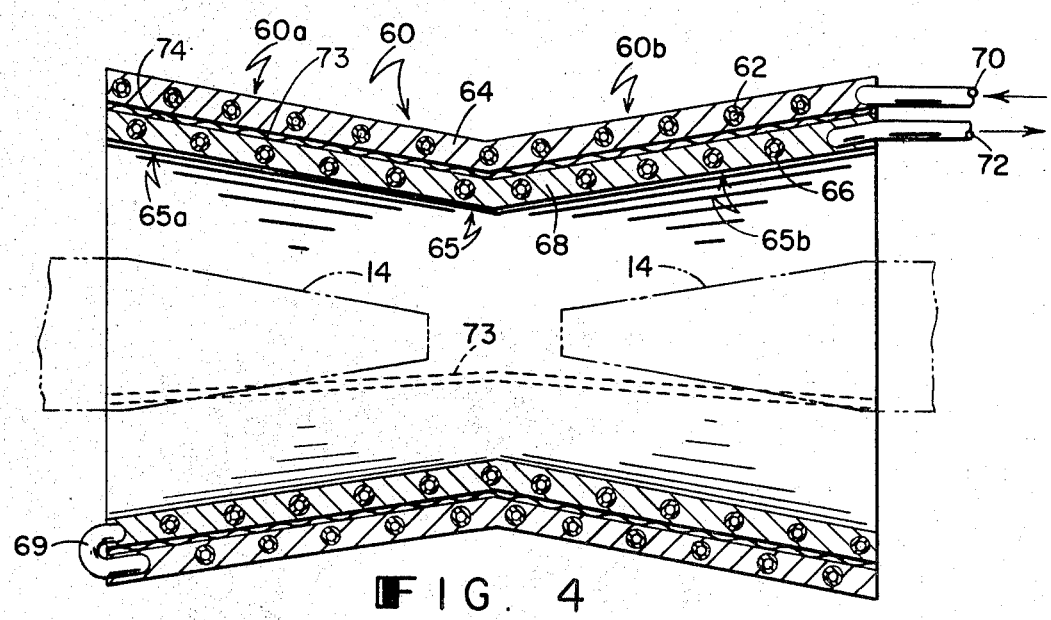
FIG. 4 is a somewhat schematic, sectional view of a second embodiment of the present invention; and, FIG. 5 is a somewhat schematic sectional view of a third embodiment of the present invention.

In FIG. 4, an alternative configuration is illustrated in which an outer heat exchange member 60 is formed of two truncated open conical sections 60a, 60b, joined at their apeces to form a continuous heat exchange member having continuous helically wound tubing 62 enclosed in a thermally conductive matrix 64, again formed, for a example, of brazed shot and brazed to the tubing. Inner heat exchange member 65 is formed of two truncated open conical sections 65a, 65b (which may be formed as two separate conical pieces for assembly) joined at their apices to form a continuous heat exchange member having a continuous helically wound tubing 66 enclosed in a thermally conductive matrix 68 (e.g., of the same material and construction as matrix 64), and connected to tubing 62 by connecting tubing 69 to form a continuous tubular passage. Where two burners 14 are interiorly located, as shown in phantom in FIG. 4, liquid flow is through feed liquid inlet 70, helically wound tubing 62, connecting tubing 69, inner helically wound tubing 66, and superheated vapor outlet 72. As shown in FIG. 4, three elongated thin (e.g., stainless steel) spacer members 73, 120° spaced, separate the matrices 64 and 68 to provide a thermal conduction air barrier 74 therebetween. The heat exchange members and heaters may be enclosed in a suitable mainfold (not shown), and operation is otherwise the same as described for the embodiment of FIG. 1, liquid flow being dependent on whether burners 14 are within or outside of the heat exchange members.

Figure 2:
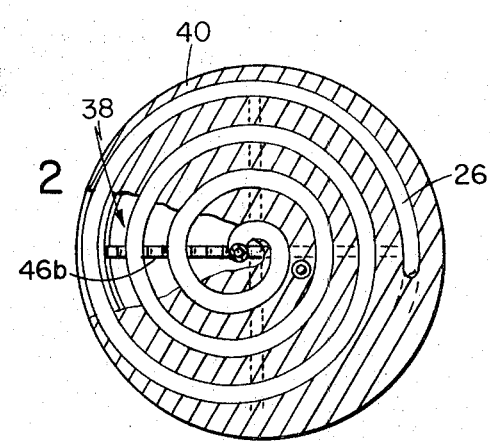
FIG. 2 is a top sectional view, partially broken away, of the heat exchange members only of the embodiment of FIG. 1, along line 2-2 thereof.
Figure 3:
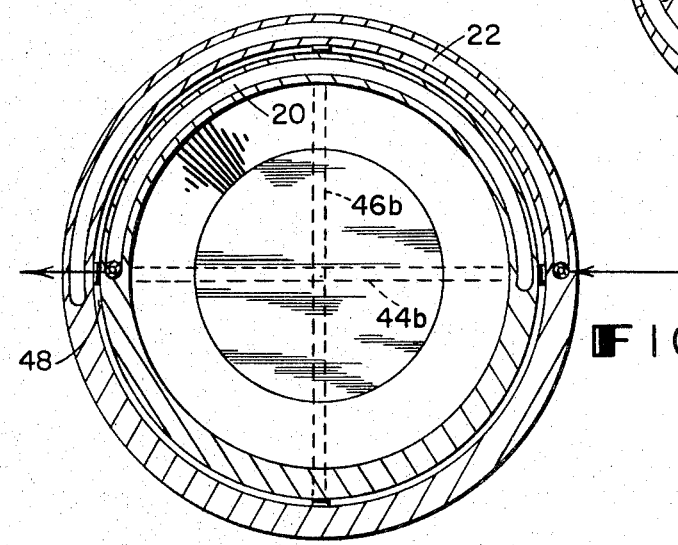
FIG. 3 is a bottom sectional view of these heat exchange members along line 3-3 of FIG. 1.
Figure 5:
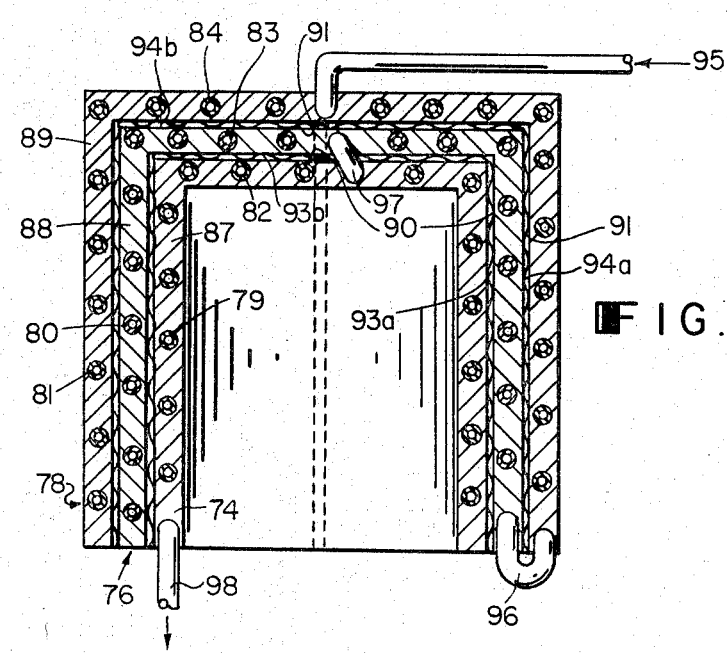

Still another embodiment of the invention is shown in FIG. 5. Three concentric cylindrical heat exchange members 74, 76, 78, have circumferentially and axially extending helically wound tubing 79, 80, 81, respectively, top-defining radially extending spirally wound tubing 82, 83, 84, respectively, and thermally conductive porous matrices 87, 88, 89 respectively, surrounding the tubing. Two pairs of spacer members 90, 91, of corrugated stainless steel, identical to spacers 44, 46 of FIGS. 1—3, having portions extending along the circumferential walls of matrices 87, 88, 89, to provide annular gaseous thermal conduction barriers 93a, 94a, between matrices 87 and 88, and matrices 88 and 89, respectively, and crossbar portions providing gaseous thermal conduction barriers 93b, 94b. When these heat exchange members are adapted for receiving a heater interiorly thereof, liquid flow will be through feed liquid inlet 95, outer tubing 84, 81, connecting tubing 96, intermediate tubing 80, 83, connecting tubing 97, and inner tubing 82, 79, and out through superheated vapor outlet 98. Thermal conduction barriers 93a, 94a, insulate the outer feed liquid tubing 81 from the innermost superheated vapor tubing 79.

The tubing may be coiled in any manner consistent with feeding the liquid efficiently through zones of generally increasing thermal capacity for gradually heating the liquid to boiling and superheated vapor stages, and consistent with providing a thermal conduction barrier at least between the feed liquid and the superheated vapor. The matrix may surround the tubes, and should at least fill the region between adjacent tube windings.

The spacers utilized to separate adjacently nested heat exchange members preferably are sized to have at least the major portion of the peripheral area between the members filled with an insulating barrier material, such as gases and, if thermally conductive, should be of minimal thickness consistent with separatory strength requirements, in order not to countermand substantially the thermal barrier effects of the insulating portions of the gap. Corrugated spacers, as shown, have the advantage of minimizing heat conductivity while establish a circumferentially integral peripheral thermal conduction barrier.

Where the heat exchange members are concentric hollow bodies as shown (at least two and usually preferably not more than three), at least the tubing containing feed liquid should be thermally insulated from the remainder of the generator, or at least from the tubing containing superheated vapor. The need for such barriers decreases as the liquid or vapor temperature differential between adjacent tubing portions decreases.

In addition to the brazed metal shot matrix disclosed in the preferred embodiment, it will be understood that other porous matrixes, such as foamed metal, brazed metal wool, screens, etc. may also be employed.

Other embodiments will occur to those skilled in the art and are within the following claims.

I claim:

1. A vapor generator utilizing heated gases to convert feed liquid to superheated vapor comprising:
   at least two nested heat exchange members each comprising a coiled tubular portion and a continuous thermally conductive porous matrix located between the adjacent windings of each said coiled tubular portion and in thermal contact with said windings for conducting heat thereto;
   said tubular portions being located in series with respect to both the heated gas and the liquid to vapor flow paths to provide a cross-counterflow arrangement, and connected to form a continuous tubular passage having a feed liquid inlet at one end and a superheated vapor outlet at the other end, and adapted to receive heat from said heated gases to provide along said tubular passage successively a feed liquid heating zone, a boiling liquid zone, and a vapor superheating zone; and
   a thermal conduction barrier between said feed liquid zone and said vapor superheating zone, and between said matrices in the region of said zones.

2. A vapor generator according to claim 1 wherein the major portion of said thermal conduction barrier is formed of gasses.

3. A vapor generator according to claim 1 wherein said tubular portions are coiled to define generally concentric hollow heat exchange members having a circular cross section and at least one open axial end.

4. A vapor generator according to claim 1 wherein each said tubular portion is surrounded by a porous metal matrix, having portions brazed to said tubular portion, and in which porous matrices surrounding tubular portions of adjacent heat exchange members are spaced from one another by a said thermal conduction barrier.

5. A vapor generator according to claim 4 including a plurality of radially spaced thin spacer members extending in an axial direction along the adjacent circumferential surfaces of adjacently nested heat exchange members to define therebetween a circumferential thermal conduction barrier composed, in major part, of gases.

6. A vapor generator according to claim 5 wherein each said tubular portions is coiled additionally to define a closed planar end for a each said heat exchange member, said heat exchange members being adapted for nesting with said closed ends adjacently located.

7. A vapor generator according to claim 6 including a radially extending thermal conduction barrier between said adjacent closed ends.

8. A vapor generator according to claim 6 wherein said tubular portions are coiled to define concentric frustroconical heat exchange members having closed apices.

9. A vapor generator according to claim 8 wherein each said closed apex is formed of a spirally wound tubular portion terminating in a short outwardly directed axial tubular section, and said tubular portions are interconnected across said axial tubular sections.

10. A vapor generator according to claim 5 wherein each said tubular portion is formed of tubular sections coiled and interconnected to define two concentric, oppositely extending frustroconical heat exchange sections having a common apex.

11. A vapor generator according to claim 6 wherein said tubular portions are coiled to define concentric cylindrical heat exchange members having one closed end.

12. A vapor generator according to claim 1 wherein said tubular portions are helically coiled.

13. A vapor generator according to claim 1 including three nested heat exchange members, and two thermal conduction barriers alternating with said heat exchange members.

UNITED STATES PATENT OFFICE
CERTIFICATE OF CORRECTION

Patent No. 3,563,212      Dated February 16, 1971

Inventor(s) Lawrence C. Hoagland

It is certified that error appears in the above-identified patent and that said Letters Patent are hereby corrected as shown below:

Column 1, line 55, after "surface", delete "a".

Column 1, lines 57-58, after "efficiency", delete "in the generator,".

Column 4, claim 6, line 2, after "tubular", change "portions" to --portion--.

Column 4, claim 6, line 3, after "for", delete "a".

Signed and sealed this 7th day of September 1971.

(SEAL)
Attest:

EDWARD M. FLETCHER, JR.　　　　　ROBERT GOTTSCHALK
Attesting Officer　　　　　　　　　Acting Commissioner of Pat